(12) United States Patent
Tian

(10) Patent No.: US 12,103,717 B2
(45) Date of Patent: Oct. 1, 2024

(54) QUICK-RELEASE WING STRUCTURE AND AN UNMANNED AERIAL VEHICLE USING THE SAME

(71) Applicant: Autoflight (Kunshan) Co., Ltd., Kunshan (CN)

(72) Inventor: Yu Tian, Hong Kong (CN)

(73) Assignee: Autoflight (Kunshan) Co., Ltd., Jiangsu Province (CN)

( * ) Notice: Subject to any disclaimer, the term of this patent is extended or adjusted under 35 U.S.C. 154(b) by 0 days.

(21) Appl. No.: 18/191,861

(22) Filed: Mar. 28, 2023

(65) Prior Publication Data

US 2023/0303273 A1    Sep. 28, 2023

(30) Foreign Application Priority Data

Mar. 28, 2022  (CN) .......................... 202220689659.2

(51) Int. Cl.
*B64U 30/14*        (2023.01)
(52) U.S. Cl.
CPC .................................... *B64U 30/14* (2023.01)
(58) Field of Classification Search
CPC ....... B64C 1/26; B64C 2211/00; B64U 10/25; B64U 30/10; B64U 30/14; B64U 80/00; B64U 80/70
See application file for complete search history.

(56) References Cited

U.S. PATENT DOCUMENTS

2020/0070973 A1*   3/2020   Grubb ....................... B64C 3/38
2022/0234718 A1*   7/2022   Qiu ....................... B64C 39/024

FOREIGN PATENT DOCUMENTS

| CN | 207157486 U | * | 3/2018 |
| CN | 111204444 A | * | 5/2020 |
| CN | 112520011 A | * | 3/2021 |

* cited by examiner

*Primary Examiner* — Joshua J Michener
*Assistant Examiner* — Arfan Y. Sinaki
(74) *Attorney, Agent, or Firm* — WPAT Law, P.C.; Anthony King

(57) ABSTRACT

A quick-release wing structure includes a lock cylinder assembly and a lock head. The lock cylinder assembly is installed in the fuselage. The lock cylinder assembly includes a shell and a lock plate. An installation slot is opened inside the shell. The side wall of the installation slot is provided with a clamping hole connected with the installation slot. The lock plate is sliding and arranged in the installation slot. The lock head is installed in the wing. A locking slot is set on the periphery of the lock head. The lock head can pass through the clamping hole and drive the lock plate to move. When the locking slot is facing the lock plate, the lock head is clamped onto the locking slot and fixed. The UAV includes the quick-release wing structure described above.

10 Claims, 8 Drawing Sheets

QUICK-RELEASE WING STRUCTURE AND AN UNMANNED AERIAL VEHICLE USING THE SAME

FIELD OF THE DISCLOSURE

The invention relates to the technical field of unmanned aerial vehicles, in particular to a quick-release wing structure and an unmanned aerial vehicle.

BACKGROUND OF THE INVENTION

With the development of the times, the composite wing UAV is used increasingly widely. The aircraft has the multi-rotor parachute protection function. In the fixed-wing flight state, if there are large flying attitude, steering gear failure, and thrust motor failure, the aircraft will automatically start the multi-rotor protection function to ensure the safety of the aircraft. The composite wing UAV usually has two long wings to ensure the aircraft's long-term and long-distance cruise, but the long wings increase the difficulty of aircraft transportation and reduce the flexibility and convenience of the aircraft. The locking structures of the existing detachable wings are mostly complex, and to ensure the connection strength, it's a little difficult to disassemble and assemble the UAV.

Therefore, there is an urgent need for a quick-release wing structure and a UAV to solve the above problems.

SUMMARY OF THE INVENTION

This invention aims to provide a quick-release wing structure and a UAV. The operation is convenient and fast, and it is convenient for wing to be disassembled and replacement with high stability and reliability.

To solve the above technical problem, the present invention provides a quick-release wing structure, comprising:
  a lock cylinder assembly, which is installed in the body, and the lock cylinder assembly comprises a shell and a lock plate; the shell is internally provided with an installation slot; the side wall of the installation slot is provided with a clamping hole which is connected with the installation slot, and the lock plate is set in the installation slot in a sliding manner;
  a lock head, which is installed in the wing; the lock head is provided with a locking slot on the periphery; the lock head can pass through the clamping hole and drive the lock plate to move; when the locking slot is facing the lock plate, the lock head is clamped onto the locking slot and fixed.

As a preferred solution to the quick-release wing structure, the lock cylinder assembly further comprising:
  a bolt, which slides along the installation slot in its depth direction and is arranged in the installation slot; the inner wall of the bolt is provided with an installation through hole, the lock plate is embedded in the installation through hole, and the lock plate is fixedly connected to the bolt;
  an elastic part, the two ends of the elastic part are respectively connected with one end of the lock plate and one end of the bolt.

As a further preferred solution to the quick-release wing structure, the circumferential wall of the installation through hole is provided with a clamping slot, the lock plate is clamped in the clamping slot, the lock plate is provided with a locking hole, the part of the circumferential wall of the locking hole is provided with an arc-shaped groove, and the arc-shaped groove is matched with the bottom of the locking slot.

As a further preferred solution to the quick-release wing structure, a limit slot is set at the bottom of the installation slot, and one end of the elastic part is embedded in the limit slot.

As a further preferred solution to the quick-release wing structure, the opposite sides of the shell are respectively provided with sliding holes, the sliding holes are connected with the installation slot, the two opposite sides of the bolt are respectively provided with clips, and the two clips are respectively connected with the two sliding holes.

As a further preferred solution to the quick-release wing structure, the wing structure further includes:
  an elastic fragment, the two opposite sides of the bolt are respectively provided with a collision avoidance groove, one end of the elastic fragment is connected to one side of the collision avoidance groove, and the other end is protruding outward and provided with the clips.

As a further preferred solution to the quick-release wing structure, the end of the bolt far from the elastic part extends out of the installation slot and protrudes from the fuselage.

As a further preferred solution to the quick-release wing structure, the end face of the bolt far from the elastic part is set as an inclined plane.

As a further preferred solution to the quick-release wing structure, the front end of the lock head is cone-shaped.

An unmanned aerial vehicle comprises a quick-release wing structure according to any one of the preceding solutions.

The invention has the beneficial effects that:

The invention provides a quick-release wing structure, comprising a lock cylinder assembly and a lock head. By installing the lock cylinder assembly in the fuselage and the lock head in the wing, the wing and fuselage can be quickly disassembled and replaced, which is convenient for the replacement and maintenance of the wing. During the process of the rapid installation of the wing, the lock head is extended into the clamping hole, so that the lock head pushes the lock plate to move. When the locking slot on the lock head is facing the lock plate because the lock plate can slide, the lock plate can clamp the locking slot. At the same time, under the limit of the clamping hole, the lock head cannot move freely, and the locking slot cannot separate itself from the lock plate, that is, the lock head and the lock cylinder assembly are clamped, thus completing the installation of the wing. When the wing needs to be removed, just move the lock plate to make it out of the locking slot, and then pull the lock head to exit the lock cylinder assembly along the clamping hole, thus completing the removal. Using the above structure, the lock head in the wing is inserted into the lock cylinder assembly in the fuselage and automatically locked without other operations, and the operation is convenient and fast. After the locking process, the locking plate and the clamping hole jointly limit the movement of the lock head, which has high stability, better locking effect and higher reliability.

BRIEF DESCRIPTION OF DRAWINGS

In order to more clearly explain the technical solution in the embodiments of the invention, the following will briefly introduce the drawings needed in the description of the embodiments of the invention. Obviously, the drawings in the following description are only some embodiments of the invention. For ordinary technicians in the field, other drawings can also be obtained according to the contents of the embodiments of the invention and these drawings.

In the drawings.

100 fuselage; 200 wing; 300 Unmanned aerial vehicle; 1 lock cylinder assembly; 11 shell; 12 lock plate; 13 bolt; 131 clip; 132 elastic fragment; 14 elastic part; 2 lock head; 10 installation slot; 20 clamping hole; 30 locking slot; 40 sliding hole; 50 locking hole; 60 arc-shaped groove; 70 limit slot.

DETAILED DESCRIPTION

The invention will be further described in detail with the attached drawings and embodiments. It can be understood that the specific embodiments described here are only used to explain the invention, not to limit the invention. In addition, it should be noted that for the convenience of description, the attached drawings may only show part of the structure related to the invention, not the whole structure.

In the description of the invention, the terms "connected", "connected" and "fixed" should be understood in a broad sense, unless otherwise specified and limited, for example, they can be fixed connections, detachable connections, or integrated; It can be mechanical connection or electrical connection; It can be directly connected, or indirectly connected through intermediate media, or it can be the internal connection of two components or the interaction between two components. For those skilled in the art, the specific meaning of the above terms in the invention can be understood in a specific case.

In this invention, unless otherwise clearly defined and limitation, the "up" or "down" of the first feature in the second feature can include the direct contact of the first and second features, or the contact of the first and second features through other features between them instead of direct contact. Moreover, the first feature "above" the second feature, including the first feature being directly above and diagonally above the second feature, or only indicates that the horizontal height of the first feature is higher than the second feature. Wherein the first feature being "below" of the second feature include the first feature directly below and diagonally below the second feature, or only indicate that the horizontal height of the first feature is less than the second feature.

In the description of this embodiment, the terms "up", "down", "left", "right" and other orientation or position relations are based on the orientation or position relations shown in the attached drawings, which are only for the convenience of description and simplification of operation, rather than indicating or implying that the device or element referred to must have a specific orientation, be constructed and operated in a specific orientation, so they can or cannot be understood as restrictions on the invention. In the description of the invention, unless otherwise stated, "multiple" means two or more. In addition, the terms "first" and "second" are only used to distinguish between descriptions and have no special meaning.

Figure 1:
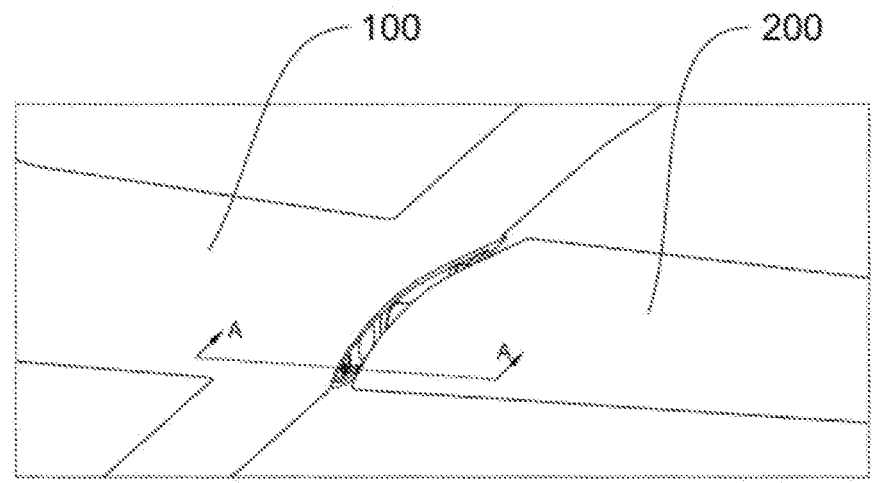
FIG. 1 is a partial structural schematic diagram of the UAV provided by the embodiment of the invention (fuselage and wing separation)
Figure 2:
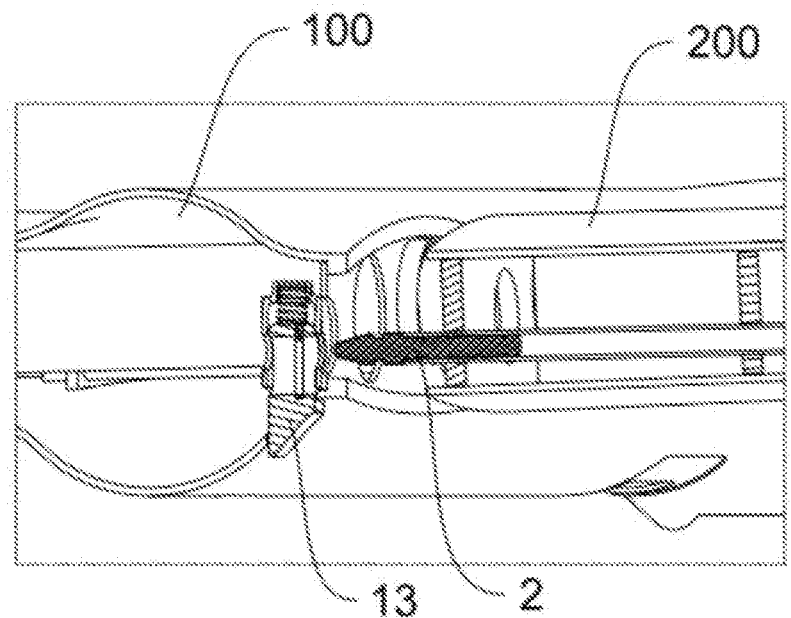
FIG. 2 is the sectional view of Part A—A in FIG. 1.
Figure 3:
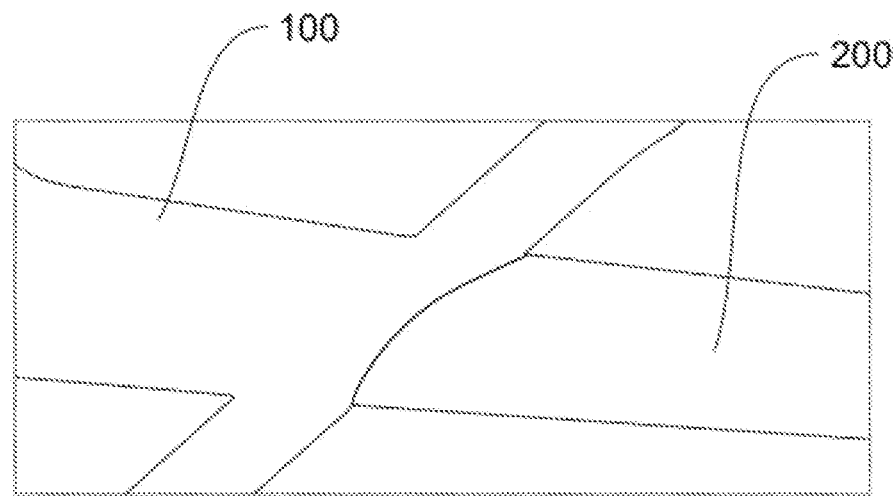
FIG. 3 is part of the structural schematic diagram II (fuselage and wing installation) of the UAV provided by the embodiment of the invention.
Figure 4:
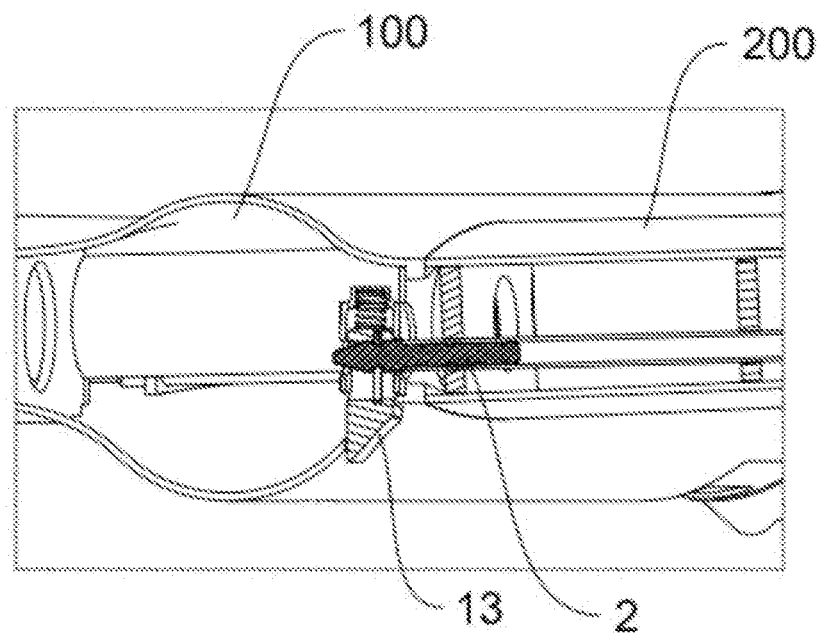
FIG. 4 is a partial structural sectional view in FIG. 3.
Figure 5:
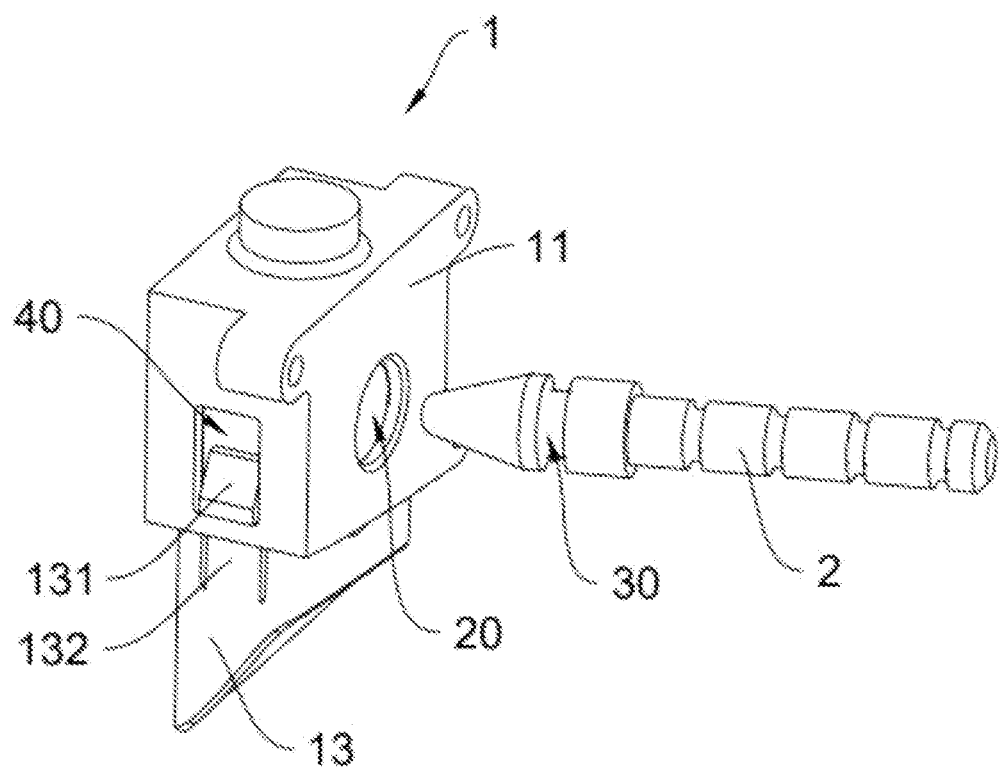
FIG. 5 is the structural schematic diagram I of the wing quick-release structure provided by the embodiment of the invention.
Figure 6:
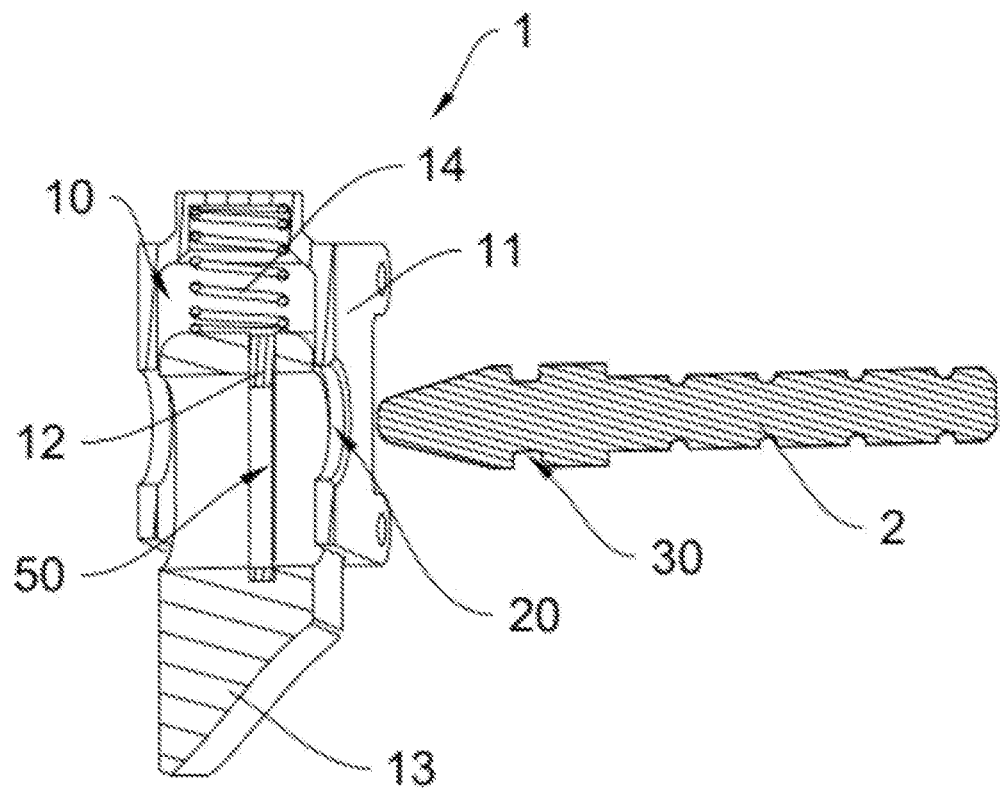
FIG. 6 is a sectional view of the wing quick-release structure provided by the embodiment of the invention.
Figure 7:
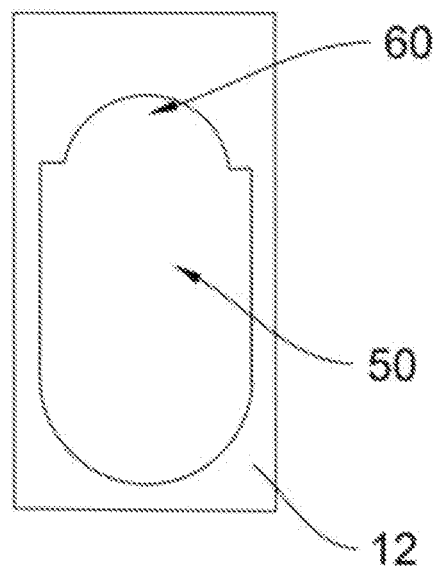
FIG. 7 is the structural diagram of the lock provided by the embodiment of the invention.
Figure 8:
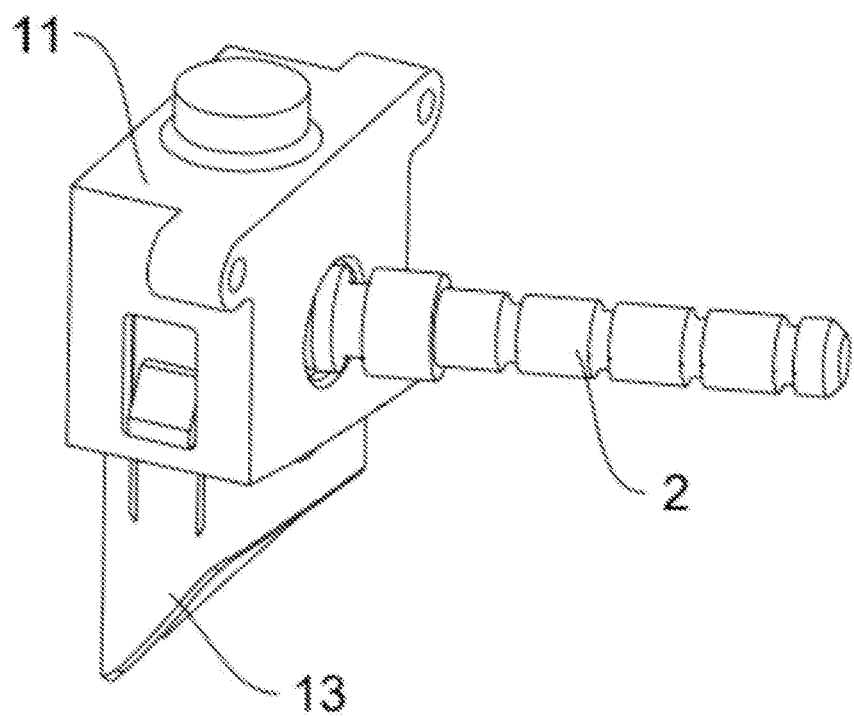
FIG. 8 is the structural schematic diagram II of the wing quick-release structure provided by the embodiment of the invention.
Figure 9:
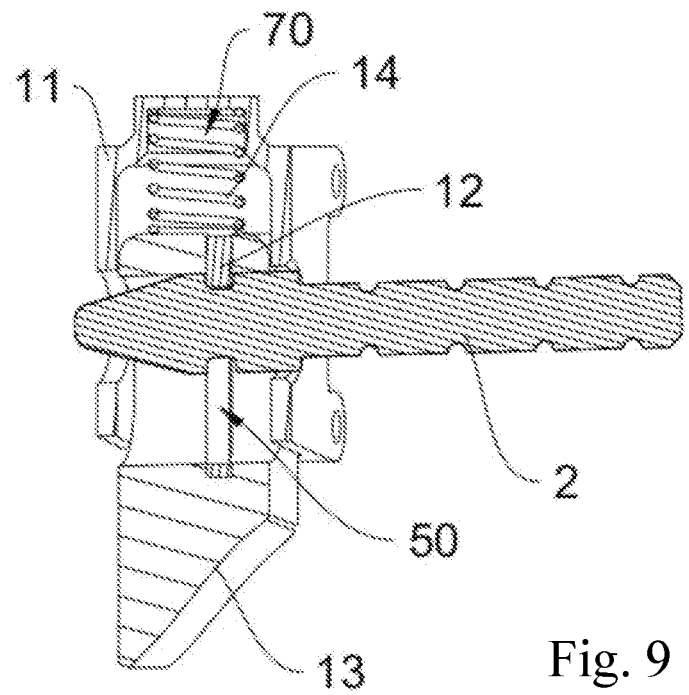
FIG. 9 is the second sectional view of the wing quick-release structure provided by the embodiment of the invention.
Figure 10:
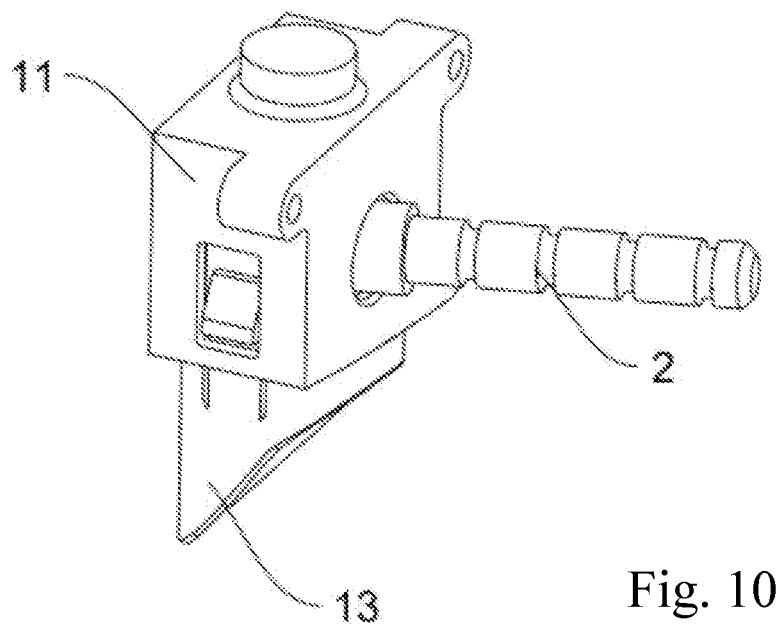
FIG. 10 is the structural schematic diagram III of the wing quick-release structure provided by the embodiment of the invention.
Figure 11:
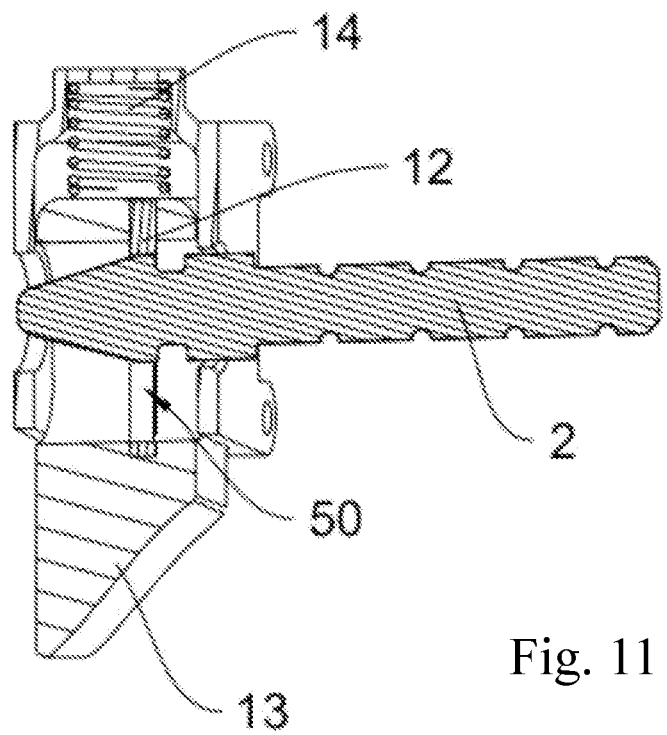
FIG. 11 is the sectional view III of the wing quick-release structure provided by the embodiment of the invention.
Figure 12:
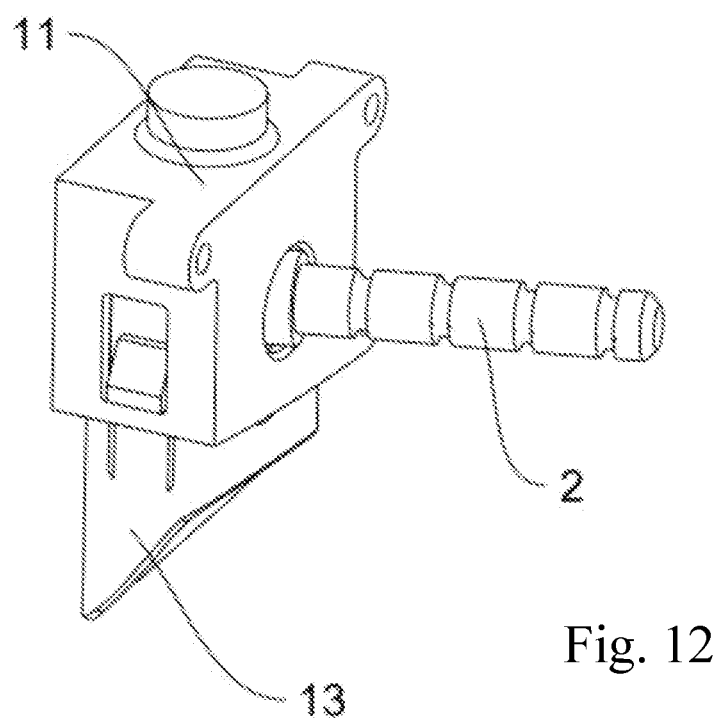
FIG. 12 is the structural diagram IV of the wing quick-release structure provided by the embodiment of the invention.
Figure 13:
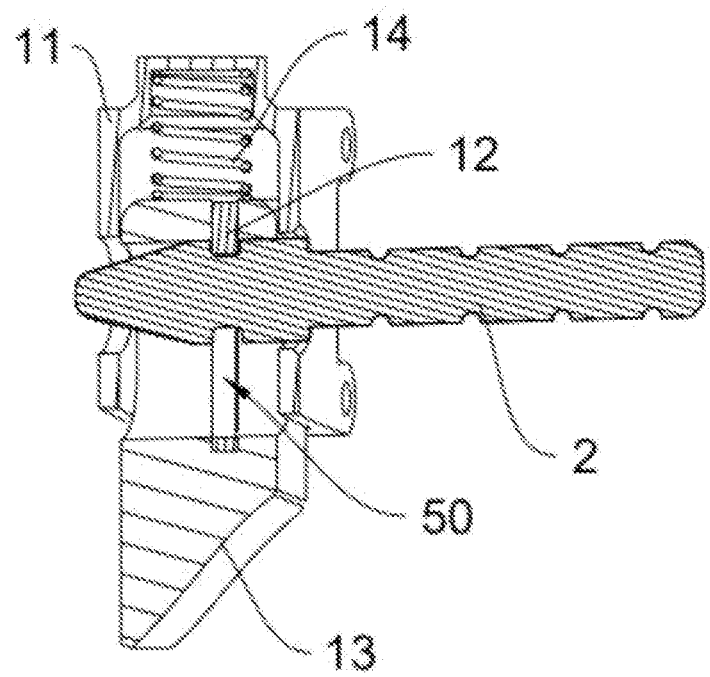
FIG. 13 is the sectional view IV of the wing quick-release structure provided by the embodiment of the invention.
Figure 14:
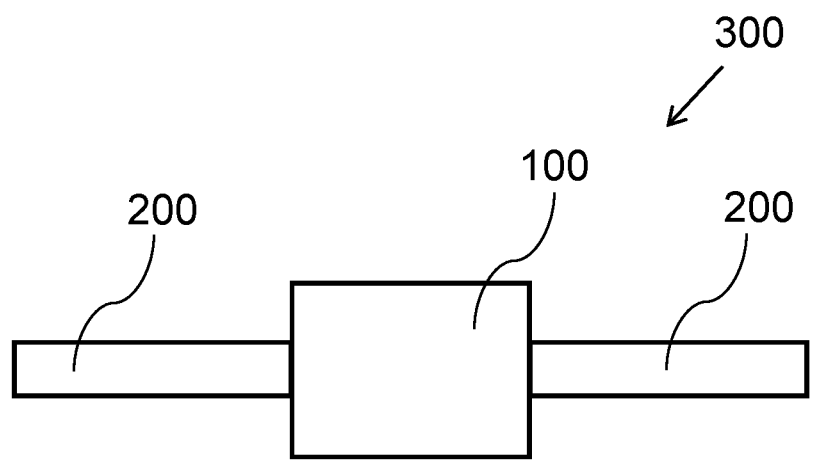
FIG. 14 illustrates one aspect of an unmanned aerial vehicle in an embodiment as described.

As shown in FIGS. 1-13, this embodiment provides a quick-release wing structure. The quick-release wing structure includes a lock cylinder assembly 1 and a lock head 2. The lock cylinder assembly 1 can be installed in the fuselage 100. The lock cylinder assembly 1 includes a shell 11 and a lock plate 12. The shell 11 is internally provided with an installation slot 10. The side wall of the installation slot 10 is provided with a clamping hole 20 connected with the installation slot 10, and the lock plate 12 is sliding in the installation slot 10. The lock head 2 is installed in the wing 200. The locking slot 30 is set on the periphery of the lock head 2. The lock head 2 can pass through the clamping hole 20 and drive the lock plate 12 to move. When the locking slot 30 is facing the lock plate 12, the lock head 2 is clamped onto the locking slot 30 and fixed, and the lock head 2 is limited to the clamping hole 20. In this embodiment, when the lock plate 12 is in the initial position, the lock plate 12 may partially cover the clamping hole 20, so that when the lock head 2 moves into the clamping hole 20, it can push the lock plate 12, and when the lock head 2 moves to the locking slot 30 directly facing the lock plate 12, the lock plate 12 can move towards the locking slot 30, so that the lock plate 12 can be able to clamp into the locking slot 30. Optionally, the other side wall of the installation slot 10 can also be provided with a clamping hole 20. When the front end of the lock head 2 is longer, the lock head 2 can pass through the two clamping holes 20 in turn.

When rapidly installing the wing 200, extend the lock head 2 into the clamping hole 20, so that the lock head 2 pushes the lock plate 12 to move. When the locking slot 30 on the lock head 2 is facing the lock plate 12, the lock plate 12 clamps the locking slot 30. At the same time, under the limitation of the clamping hole 20, the lock head 2 cannot move freely, and the locking slot 30 cannot automatically disengage from the lock plate 12, that is, the lock head 2 is clamped with the lock cylinder assembly 1 to complete the installation of the wing 200. When the wing 200 needs to be removed, just move the lock plate 12 to make it separate from the locking slot 30, and then pull the lock head 2 to exit the lock cylinder assembly 1 along the clamping hole 20 to complete the removal. Under the above quick-release structure, the lock head 2 in the wing 200 is inserted into the lock cylinder assembly 1 in the fuselage 100 and then automatically locked, without other operations, which is convenient and fast. After the locking process, the lock plate 12 and the clamping hole 20 jointly limit the movement of the lock head 2, which has high stability, better locking effect and higher reliability.

Preferably, the front end of the lock head 2 is cone-shaped, which facilitates the front end of the lock head 2 to contact the lock plate 12 and push the lock plate 12 to move. For example, the lock head 2 moves in the first direction. When the conical front end of the lock head 2 contacts the lock plate 12 and continues to move, the lock plate 12 moves in the second direction along the conical front end, and the first direction is perpendicular to the second direction, thus improving the smoothness of disassembly and assembly of the wing 200 and the fuselage 100.

Preferably, the lock plate 12 and the lock head 2 are made of metal materials with high strength and high bearing capacity, thus improving the connection between the wing 200 and the fuselage 100.

As shown in FIG. 5 to FIG. 13, the locking process of lock head 2 and lock cylinder assembly 1 is shown. Specifically, the lock cylinder assembly 1 includes a bolt 13 and an elastic part 14. The bolt 13 slides along the groove depth direction of the installation slot 10 and is arranged in the installation slot 10. The inner wall of the bolt 13 is provided with a through hole for installation, the lock plate 12 is embedded in the through hole for installation, and the lock plate 12 is fixedly connected to the bolt 13. The two ends of the elastic part 14 are respectively connected to the bottom of the installation slot 10 and one end of the bolt 13. Under the action of the elastic part 14, the bolt 13 is pressed to the initial position. When the lock head 2 extends into the clamping hole 20 and moves, the lock head 2 pushes the lock plate 12, drives the bolt 13 to move, and the bolt 13 compresses the elastic part 14. When the lock head 2 moves to the locking slot 30 facing the lock plate 12, under the reset action of the elastic part 14, the bolt 13 faces the initial position, moving the lock plate 12 to clamp the locking slot 30. When the end of the bolt 13 which is away from the elastic part 14 is pushed to move towards the elastic part 14, the lock plate 12 is driven to disengage from the locking slot 30, so that the lock head 2 can be pulled out from the clamping hole 20, and the removal of the wing 200 is completed, which is easy to operate. And because the lock plate 12 needs to be matched with the locking slot 30, so the lock plate 12 is thin. The lock plate 12 is embedded in the bolt 13 to improve the strength and pressure bearing capacity of the lock plate 12, ensuring the stability of the lock plate 12, and avoid the shaking of the lock plate 12 caused by stress, improving the lifespan and safety of the lock plate 12. The elastic part 14 is optional but not limited to compression spring, which is cheap and easy to obtain, and has good structural strength and elastic force.

Preferably, the end of the bolt 13 that is away from the elastic part 14 extends out of the installation slot 10 and protrudes from the fuselage 100, which is convenient to directly push the bolt 13, and the removal of the wing 200 can be realized without the help of tools. More preferably, the end face of the bolt 13 away from the elastic part 14 is set as an inclined plane to match the shape of the fuselage 100 and improve the appearance beauty and smoothness of the fuselage 100.

Preferably, a limit slot 70 is clamped at the bottom of the installation slot 10, and one end of the elastic part 14 is embedded in the limit slot 70. The setting of the limit slot 70 avoids the bending of the elastic part 14 during the movement and ensures the normal operation of the elastic part 14, thus ensuring the normal operation of the bolt 13, and improving the reliability of the quick-release wing structure in the using process. For example, the bottom of the installation slot 10 is provided with a through hole, the cover of the through hole is provided with a limit cap, and the limit slot 70 is limited in the limit cap. The limit slot 70 is connected with the through hole and the installation slot 10. The setup of limit slot 70 can be achieved by the limit cap to avoid being limited by the thickness of the shell 11, otherwise it will be resulting in the smaller depth of the limit slot 70 or the reduced strength of the shell 11.

In this embodiment, the circumferential wall of the through-hole is provided with a clamping groove, the lock plate 12 is clamped in the clamping groove, the lock plate 12 is provided with a locking hole 50, the part of the circumferential wall of the locking hole 50 is provided with an arc-shaped groove 60, and the arc-shaped groove 60 is matched with the bottom of the locking slot 30. By setting the slot, the lock plate 12 can be fixed in the slot with high stability. The four sides of the lock plate 12 are embedded in the slot to improve the force uniformity of the lock plate 12, thus improving the reliability of the lock plate 12. The contact area between the lock plate 12 and the locking slot 30 is increased and the pressure bearing capacity is improved by setting the arc-shaped groove 60 that is suitable for the locking slot 30.

Preferably, part of the arc-shaped groove 60 is arranged on the lock plate 12, which protrudes from the clamping groove, and the rest of the lock plate 12 is located in the clamping groove, so that the bearing force by this part can be transferred to other parts of the lock plate 12 and to the bolt 13, further improving the stability of the quick-release wing structure.

Furthermore, the opposite sides of the shell 11 are respectively provided with sliding holes 40, the sliding holes 40 are connected with the installation slots 10, the opposite sides of the bolt 13 are respectively provided with clips 131, and the two clips 131 are respectively connected to the two sliding holes 40 and can slide along the sliding holes 40. The clip 131 is clamped in the sliding hole 40 so that the bolt 13 can not only be installed in the shell 11, but also be moved. In addition, due to the elastic part 14, when the clip 131 abuts against one end of the sliding hole 40, the bolt 13 is in the initial position, that is, the initial position of the bolt 13 is determined by the fit of the clip 131 and the sliding hole 40.

Specifically, the two opposite sides of the bolt 13 are respectively provided with collision avoidance slots, one end of the elastic fragment 132 is connected to the surrounding wall of the collision avoidance slot, and the other end is protruding outward and is provided with the above-mentioned clip 131. Under the above structure, one end of the clip 131 set on the elastic fragment 132 can be pushed into the collision avoidance slot, so that the bolt 13 can be inserted into the installation slot 10. When the elastic fragment 132 is released, the clip 131 will pop out automatically, until the clip 131 moves to the sliding hole 40, the clip 131 will snap into the sliding hole 40 to realize the installation of the bolt 13 and the shell 11. When the clip 131 is pressed again and the bolt 13 is pulled outward, the clip 131 exits the sliding hole 40, and the bolt 13 exits along the installation slot 10 to realize the removal of the bolt 13. It is not only simple in structure and convenient in operation, but also convenient for the replacement and maintenance of the bolt 13, saving costs.

As shown in FIGS. 1-4, this embodiment also provides a UAV, which includes the above quick-release wing structure. First, install the lock cylinder assembly 1 in the fuselage 100, the lock head 2 in the wing 200, then insert the lock head 2 into the lock cylinder assembly 1 to achieve automatic locking, and push the bolt 13 to achieve the removal of the wing 200. It is not only easy to operate, firm and stable to connect, but also convenient to transport the UAV with disassembled wing 200, saving transportation costs.

Note that the above is only a better embodiment of the invention and the applied technical principles. Those skilled in the art will understand that the invention is not limited to the specific embodiments described here. For those skilled in the art, various obvious changes, readjustments and replacements can be made without departing from the protection scope of the invention. Therefore, although the invention is described in more detail through the above embodiments, the invention is not limited to the above embodiments, but can also include more equivalent embodiments without departing from the concept of the invention, and the scope of the invention is determined by the scope of the appended claims.

What is claimed is:

1. A quick-release wing structure, comprising:
    a lock cylinder assembly (1) installed in a body (100), and the lock cylinder assembly (1) comprises a shell (11) and a lock plate (12);
    the shell (11) is internally provided with an installation slot (10);
    a side wall of the shell is provided with a clamping hole (20) which is connected with the installation slot (10), and the lock plate (12) is set in the installation slot (10) in a sliding manner;
    a lock head (2) installed in a wing (200);
    the lock head (2) is provided with a locking slot (30) on a periphery of the lock head;
    wherein the lock head (2) passes through the clamping hole (20) to drive the lock plate (12) to move;
    a bolt (13), which slides along the installation slot and is arranged in the installation slot (10);
    an elastic part (14) having two ends;
    wherein the lock plate (12) is fixedly connected to the bolt (13); and
    wherein the shell (11) further comprises a plurality of sliding holes (40), each sliding hole provided on two opposite sides of the shell, the sliding holes (40) are connected with the installation slot (10), wherein the bolt (13) has two opposite sides that are respectively provided with clips (131), and the said clips (131) are respectively connected with the two sliding holes (40).

2. The quick-release wing structure of claim 1, wherein the lock plate (12) is provided with a locking hole (50).

3. A unmanned aerial vehicle comprising the quick-release wing structure as recited in claim 2.

4. The quick-release wing structure of claim 1, wherein one of said two ends of the elastic part (14) is embedded in the limit slot (70).

5. A unmanned aerial vehicle comprising the quick-release wing structure as recited in claim 4.

6. The quick-release wing structure of claim 1, wherein an end of the bolt (13) extends out of the installation slot (10) and protrudes from the body (100).

7. A unmanned aerial vehicle comprising the quick-release wing structure as recited in claim 6.

8. The quick-release wing structure of claim 1, wherein a front end of the lock head (2) is cone-shaped.

9. A unmanned aerial vehicle comprising the quick-release wing structure as recited in claim 8.

10. A unmanned aerial vehicle comprising the quick-release wing structure as recited in claim 1.

* * * * *